Aug. 11, 1931.   W. C. BAILEY   1,818,187
DEVICE FOR WASHING PISTON PACKERS AND LINERS
Filed Aug. 29, 1928
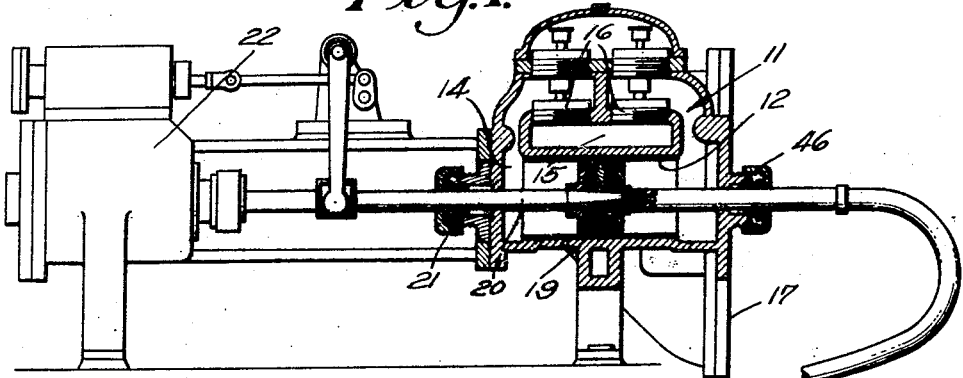
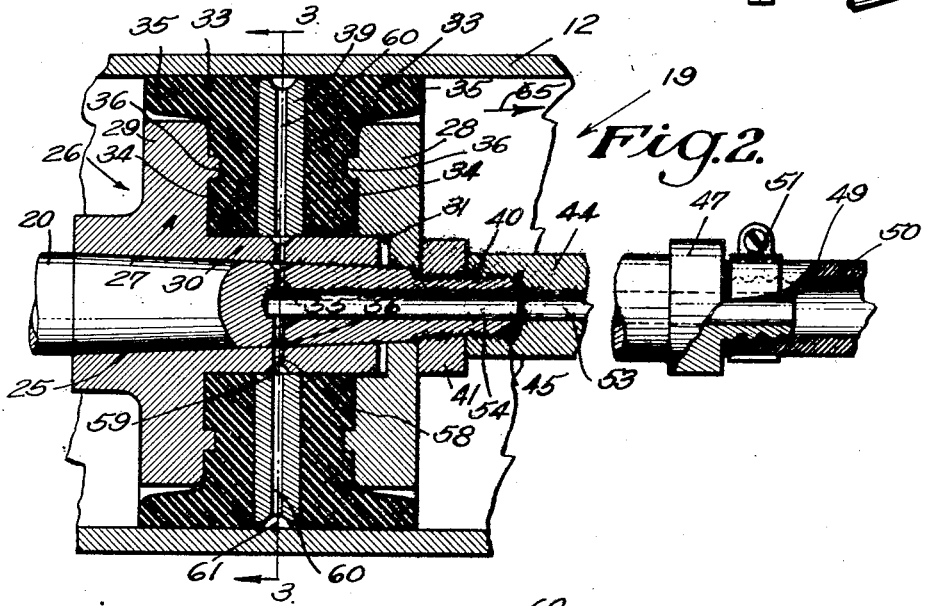
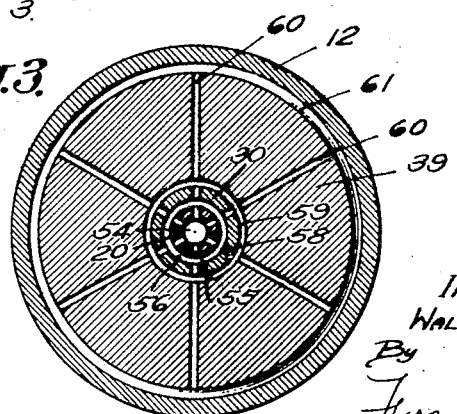
INVENTOR:
WALTER C. BAILEY
By
Ford W. Harris
ATTORNEY.

Patented Aug. 11, 1931

1,818,187

UNITED STATES PATENT OFFICE

WALTER C. BAILEY, OF NORWALK, CALIFORNIA

DEVICE FOR WASHING PISTON-PACKERS AND LINERS

Application filed August 29, 1928. Serial No. 302,842.

My invention relates to pistons, and it relates particularly to a piston having a washing-means for washing the packing-means, and a piston which will not be excessively worn on one side.

My invention is particularly applicable to what is known as a pulsating-piston, and in the following description it will be shown as applied to a pulsating-piston. It should be understood, however, that the invention may be used on other types of pistons, and it is shown in connection with a pulsating-piston solely for the purpose of illustration.

The ordinary form of pulsating-piston consists of a body and a pair of cup-shaped packing-members which are usually made from rubber or other resilient material. The packing-members are secured to the body so that their annular lips extend outward in opposite directions.

When the piston is reciprocated in a cylinder, the pressure in the end of the cylinder toward which the piston is moved, will force outward the cylindrical lip of the adjacent packing-member and cause it to tightly engage the cylinder and prevent leakage. The other packing-member at this time is in normal position and the cylindrical lip thereof is not forced by any fluid pressure against the cylinder. When the piston moves in an opposite direction the other packing-member is operated by the fluid pressure and the first mentioned packing-member is relieved of the pressure.

In the present invention it is my object to provide a washing-means for delivering a washing-fluid between the packing-means and the cylinder, primarily for the purpose of washing away grit and other abrasives which, as is well known in the art, quickly wear away the packing-means, and demands replacement of the piston and constant attention to the pump.

A further object of my invention is the provision of a washing-means particularly adapted to a pulsating-piston, the washing-means being arranged so that the washing-fluid will be passed between the packing-member which is not expanded by the fluid pressure, and the cylinder, so that when the piston moves in such a direction that this washed packing-member will be expanded, there will be no abrasives on the cylindrical lip thereof which will have a wearing action, either on the cylindrical lip or on the cylinder. The washing-means alternately washes one packing-member and then the other packing-member, and the result is that the packing-members are always clean, this naturally resulting in a longer life for the pump piston.

Another object of this invention is the provision of a piston as pointed out heretofore, in which the washing-means is connected to the central peripheral part of the packing-means. By so positioning the washing-means the washing fluid is free to pass in one direction or the other so that the packing-members are alternately cleansed.

It is a still further object of my invention to provide a pump-piston in which the washing-means is placed between a pair of packing-members, these parts being retained by a support-means. The packing-members are designed so that one of the packing-members is forced against the cylinder when the piston is moved in one direction, and the other of the packing-members is forced against the cylinder when the piston moves in the opposite direction. The washing-means supplies washing-fluid between the packing-member which is not forced against the cylinder, and the cylinder.

An additional object of this invention resides in the provision of a washing-means which includes a disc which is placed between the packing-members. The disc is provided with passages which supply the washing fluid to the periphery of the piston.

In the ordinary pump of this type the piston is reciprocated in the cylinder by means of a piston rod which extends through a stuffing-box of the cylinder, and it is connected to a prime mover in the form of a piston and cylinder, or some other reciprocating means. When the piston is at the end of its stroke farthest from the stuffing-box, the piston-rod does not properly support the piston; consequently an excessive weight is imposed on the lower part of the cylinder. This results in excessive wear, not only on the lower part of the piston, but also on the lower part of the cylinder.

It is one of the objects of this invention to provide a reciprocating pump of the character mentioned which is provided with means for supporting the piston so that at either end of the stroke, and at all times, the piston will not bear with excessive force against the lower part of the cylinder.

Another object of the invention is the provision of a pump having a piston operating in a cylinder, this piston being connected to a piston-rod which extends through a stuffing-box. To assist the piston-rod in supporting the piston, the pump is provided with a support-rod connected to the piston and extended through the opposite end of the cylinder. The support-rod extends through a bearing so that the support-rod is properly supported. The piston-rod and the support-rod cooperate to support the piston at all times, and the lower part of the piston and the lower part of the cylinder are not excessively worn.

Other objects of the invention reside in the various details of construction, and these objects will be made evident in the following description of the preferred form of my invention.

The invention may be best understood by reference to the accompanying drawings in which, Fig. 1 illustrates the utility of the invention.

Fig. 2 is an enlarged section of the invention.

Fig. 3 is a section taken on the line 3—3 of Fig. 2.

Referring first to Fig. 1, the utility view illustrates a slush-pump which is commonly used in the oil producing industry for pumping slush into a well which is being drilled. This slush carries particles of abrasive, and these particles of abrasive enter between the piston and the cylinder of the pump, and as previously pointed out, cause the packing of the piston to be cut away.

The common form of slush-pump includes one or more cylinders 11, each of which provides a liner 12. The opposite ends of the cylinders are provided in the form of chambers 14 which are connected to an inlet 15 by means of valves 16. The chambers 14 are also connected to an outlet 17 by valve-means not shown in Fig. 1 since the valve-means are located in back of the line on which the section is taken. Adapted to operate in the liner 12 is a piston 19 embodying the features of the invention. The piston 19 is attached to a piston-rod 20, which extends to the exterior of the cylinder 11 through a stuffing-box 21. The opposite end of the piston-rod 20 extends into a suitable prime mover 22 by means of which it is reciprocated.

Referring particularly to Figs. 2 and 3, the details of the piston of the invention will be described. That portion of the piston-rod 20 which receives the pump-piston 19, is tapered as indicated at 25. The piston 19 has a body indicated by the numeral 26, this body including a primary plate 27 and a secondary plate 28. The primary plate 27 includes an annular flange 29 and a cylindrical hub 30 having a tapered opening which engages the tapered-end 25 of the piston-rod 20. The end-plate 28 consists of a flange which extends onto the end of the tapered-end 25, and which has a cylindrical recess 31 which receives one end of the cylindrical hub 30. Placed on the cylindrical hub 30 is a packing-means consisting of a pair of packing-members 33. The packing-members 33 are preferably made from rubber, rubber composition, or other suitable semi-resilient material, and have radial walls 34 at the outer ends of which cylindrical lips 35 are provided. The cylindrical lips 35 extend outward in opposite directions. The nearest faces of the flanges of the primary and secondary plates 27 and 28 are provided with annular beads 36 which are adapted to be embedded in the radial walls 35 of the packing-members 33 in order to prevent leakage between these parts. Placed on the cylindrical hub 30 between the packing-members 33 is a disc 39. The disc 39 is slightly smaller in diameter than the liner 12. The end of the piston-rod 20 is threaded at 40, and a nut 41 is screwed thereonto so that the parts of the piston are clamped together as shown in Fig. 2.

Secured to the threaded-end 40 of the piston rod 20 is a support-rod 44, the support-rod 44 having a threaded cavity 45 which receives the threaded-end 40. This support-rod 44 extends from the piston 19 in a direction opposite from the piston-rod 20, and it extends through a bearing 46 to the exterior of the cylinder 11. The outer end of the support-rod 44 is provided with a nut 47 whereby it may be tightly screwed on to the threaded-end 40 of the piston-rod 20.

The outer end of the support-rod 44 is provided in the form of a nipple 49 so that a flexible hose 50 may be secured thereto by a suitable coupling 51. Formed in the support-rod 44 is a fluid passage 53. Formed in the end of the piston-rod 20 is a fluid passage 54 which communicates with the fluid passage 53. The fluid passage 54 terminates near the central part of the piston 19 and radial openings 55 connect it to the exterior of the piston-rod 20. The radial passages 55 are connected to an annular groove 56. Formed in the cylindrical hub 30 of the primary end-plate 27 are radial openings 58 which connect the annular groove 56 to an annular channel 59 formed on the exterior of the cylindrical hub 30. The disc 39 is provided with radial ducts 60 which communicate with the annular recess 59. The periphery of the disc 39 is provided with an annular groove 61 to which the radial ducts 60 are connected. The hose 50 is connected to a suitable source of washing fluid which is delivered under pressure to the piston 19.

The operation of the invention is as follows: When the piston 19 is moved in a direction indicated by the arrow 65 of Fig. 2, the slush in the right end of the cylinder 11 is compressed. The pressure of the slush causes the cylindrical lip 35 of the right packing-member to be forced outward in fluid-tight contact with the liner 12. The left packing-member 33, due to the fact that it is not subjected to a slush pressure, is not caused to tightly engage the liner 12. The washing fluid passes through the various intercommunicating passages and enters the annular grove 61.

In view of the fact that there may be a slight clearance between the left-packing-member and the liner 12 the washing fluid will pass to the left between the surfaces, and any abrasive particles, or any slush, is washed from these surfaces and they are left practically clean. When the piston reaches the end of its stroke and moves in the opposite direction a slush pressure is created in the left end of the cylinder 11. This forces the cylindrical lip 35 of the left packing-member 33 into tight contact with the liner 12. In view of the fact that the surfaces of these parts have just been cleaned by the washing fluid, there is no grit or other foreign matter to prevent a full sealing engagement of these parts. When once the cylindrical lip has been forced into engagement with the liner 12 the possibility of abrasive particles entering between these parts is quite small, at least until the piston reaches the end of its stroke where the pressures are the greatest.

Even though some of the slush and abrasive particles enter between the cylindrical lip and the liner near the end of the stroke, they do not do any damage in view of the fact that the piston is near the end of its stroke and does not move but a slight distance after the abrasive particles have entered between the parts. Immediately after that time the piston moves in the opposite direction and these abrasive particles are washed from the mentioned parts. When the piston moves to the left, the washing fluid will pass between the cylindrical lip of the right packing-member, and the liner, so that the right packing-member is cleansed at this time.

It will be seen in the foregoing description that the cylindrical lips 35 of the packing-members 33 are alternately washed or cleansed so that they may engage the liner without any abrasive particles lodging between them and the liner. In a piston incorporating the washing feature of my invention the life of the piston will be much longer than that of the ordinary piston which does not provide for cleansing the surfaces of the packing-means.

In the drawings I have shown the fluid passage 53 in the support-rod 44. If desired this part of the invention may be accomplished by eliminating the support-rod 44, and by forming the fluid-passage 53 in the piston-rod 20. It will then be necessary to attach the hose 50 to that portion of the piston-rod 20 which is to the left of the stuffing-box 21.

Another feature of the invention is the proper supporting of the piston 19 so that the piston will not engage the lower part of the liner 12 with an excessive pressure, which excessive pressure as previously pointed out, causes the lower part of the piston and the lower part of the liner to be worn away. In my invention the piston is supported on both sides so that it is impossible for the piston to sag at either end of its stroke. This feature of the invention therefore resides in the provision of a piston having a supporting-means on bo'h sides thereof, which restrains it to substantially a rectilinear motion.

It is possible to utilize the washing features of the invention without the feature of supporting the piston by the supporting-means at each end, and vice versa.

In the claims the term "cylinder" is to be construed to mean the wall which surrounds the piston, and with which the lips 35 engage.

I claim as my invention:

1. In a pump-piston, the combination of: a piston rod; a body supported on said piston rod; a pair of packing-members carried by said body, and adapted to be alternately forced against the cylinder in which the piston operates; a disc carried by said body between said packing-members, said disc having passages for delivering washing-fluid to the periphery of the piston, between said packing-members; and a rod connected to said piston rod for delivering washing-fluid to said disc.

2. In combination in a pump: a cylinder; a piston in said cylinder; a piston-rod connected to said piston and extended from said cylinder; a pair of packing-members carried by said piston, and adapted to be alternately forced against said cylinder; a disc carried by said piston between said packing-members, said disc having passages for delivering washing-fluid to the periphery of said piston, between said packing-members; and means connected to said piston for delivering washing-fluid to said disc.

3. In combination in a pump: a cylinder; a piston in said cylinder; a piston-rod connected to said piston and extended from said cylinder; a pair of packing-members carried by said piston, and adapted to be alternately forced against said cylinder; a disc carried by said piston between said packing-members, said disc having passages for delivering washing-fluid to the periphery of said piston, between said packing-members; and a rod connected to said piston for delivering washing-fluid to said disc.

4. In combination in a pump: a cylinder; a piston in said cylinder; a piston-rod connected to said piston and extended from said cylinder; a pair of packing-members carried by said piston, each of said packing-members adapted to be alternately forced against said cylinder; a disc disposed between said packing-members, said disc having a passage for supplying washing-fluid to the periphery of said piston; and a member connected to said piston-rod and adapted for supplying washing-fluid through said disc passage to said cylinder.

5. In combination in a pump: a cylinder; a piston in said cylinder; a piston-rod connected to said piston and extending therethrough; a pair of packing-members carried by said piston, said packing-members adapted to be alternately forced against said cylinder; a disc disposed between said packing-members, said disc having passages therein; a member connected to an extended end of said piston-rod for delivering washing-fluid through said disc passages to the periphery of said piston; and means for connecting said packing-members and said disc to said piston.

6. In combination in a pump: a cylinder; a piston in said cylinder; a piston-rod connected to said piston; a pair of packing-members connected to said piston; a disc disposed between said packing-members having passages leading to the periphery of said piston; connecting means for said packing-members and disc to said piston; and supporting means for said piston-rod adapted to deliver washing-fluid to the periphery of said piston through said disc passages.

7. In combination in a pump: a cylinder; a piston in said cylinder; a piston-rod connected to said piston and having a passage therein; a pair of packing-members connected to said piston; a disc disposed between said packing-members, said disc having passages formed therein; and a member connected to said piston-rod for delivering washing-fluid through said passages to the periphery of said piston, said member supporting one end of said piston-rod.

8. In combination in a pump: a cylinder; a piston in said cylinder; a piston-rod connected to said piston and having a passage therein; a pair of packing-members connected to said piston; a disc disposed between said packing-members, said disc having passages communicating with said piston-rod passage; a member connected to said piston-rod for delivering washing-fluid through said passages to the periphery of said piston; and means for supporting said piston-rod and member in a manner to prevent excessive wear of said piston on said cylinder.

9. The combination as set forth in claim 7 in which is included means for adjustably connecting the piston and member to said piston-rod.

10. In combination in a pump: a cylinder casing including a cylinder; a piston-rod extended through one end of said casing; a piston connected to said piston-rod; a pair of packing-members connected to said piston; a disc carried by said piston between said packing-members, said disc having passages for delivering washing-fluid to the periphery of said piston between said packing-members; a fluid supply member disposed in alignment with said piston-rod and adapted for delivering washing-fluid to said disc; and means on said cylinder casing for supporting said fluid supply member in alignment with said piston-rod.

11. In combination in a pump: a cylinder casing including a cylinder; a piston operable in said cylinder; a piston-rod extending through one end of said casing and connected to said piston; a pair of packing-members carried by said piston, one of said packing-members being forced against the cylinder when the piston is moved in one direction, and the other of said packing-members being forced against the cylinder when the piston moves in an opposite direction; a fluid supply means for supplying washing-fluid between the said packing-member which is not forced against the cylinder and the cylinder, said fluid supply means including a disc disposed between said packing-members and a member extending through the opposite end of said cylinder casing; and means on said cylinder casing for holding said piston-rod and member in alignment.

12. In combination in a pump: a cylinder casing including a cylinder; a piston-rod extending through one end of said casing; a piston on said piston-rod; a pair of packing-members carried by said piston, one of said packing-members adapted to be alternately forced against the walls of said cylinder; a disc disposed on said piston-rod between said packing-members, said disc having passages for delivering washing-fluid to the periphery of said piston, between said packing-members; a fluid supply member extending through the opposite end of said cylinder casing for delivering a washing-fluid to said disc; and guide means on said cylinder casing for supporting said piston-rod and fluid supply member in said cylinder casing.

13. In combination in a pump: a cylinder casing including a cylinder; a piston-rod extending through one end of said casing; a piston on said piston-rod; a pair of packing-members carried by said piston, one of said packing-members adapted to be alternately forced against the walls of said cylinder; a disc disposed on said piston-rod between said packing-members, said disc having passages for delivering washing-fluid to the periphery of said piston, between said packing-members; a fluid supply member extending through the opposite end of said cylinder casing for delivering a washing-fluid to said disc; and bearing elements on said cylinder casing engaging said piston-rod and fluid supply member for holding said piston against sidewise deviation in said cylinder.

In testimony whereof, I have hereunto set my hand at Los Angeles, California, this 15th day of August, 1928.

WALTER C. BAILEY.